Aug. 14, 1951  J. H. DANUSER  2,564,355
GRADER BLADE LOCKING AND MANIPULATING MEANS
Filed July 9, 1947  2 Sheets-Sheet 1

INVENTOR
JOHN HENRY DANUSER
BY
ATTORNEY

Aug. 14, 1951  J. H. DANUSER  2,564,355
GRADER BLADE LOCKING AND MANIPULATING MEANS
Filed July 9, 1947  2 Sheets-Sheet 2

INVENTOR
JOHN HENRY DANUSER
BY  *Lawrence H. Cohn*
ATTORNEY

Patented Aug. 14, 1951

2,564,355

UNITED STATES PATENT OFFICE 2,564,355

GRADER BLADE LOCKING AND MANIPULATING MEANS

John Henry Danuser, Fulton, Mo.

Application July 9, 1947, Serial No. 759,793

6 Claims. (Cl. 37—159)

This invention relates to a tractor implement, and more particularly to an improved tractor attachment for grading, terracing, bull-dozing and various other farm and road maintenance purposes.

An object of the invention is to provide an efficient, low cost implement of this character of rugged, durable construction, having an improved adjustable blade structure which adapts the implement for a wide variety of agricultural and other uses.

An important object of the invention is directed to improvements relating to control and locking provisions for the blade structure which greatly facilitate angular adjustments thereof.

Other objects and advantages of the invention will be apparent from the following description and accompanying drawings wherein.

Figure 5:
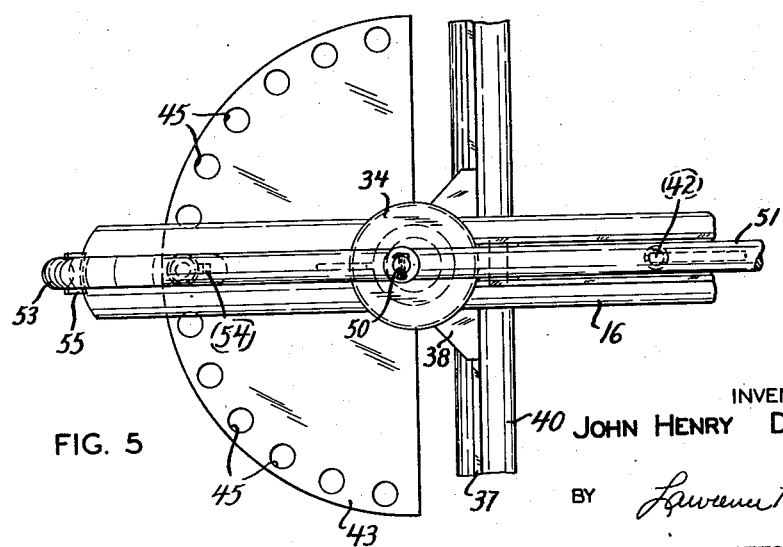
Figure 3:
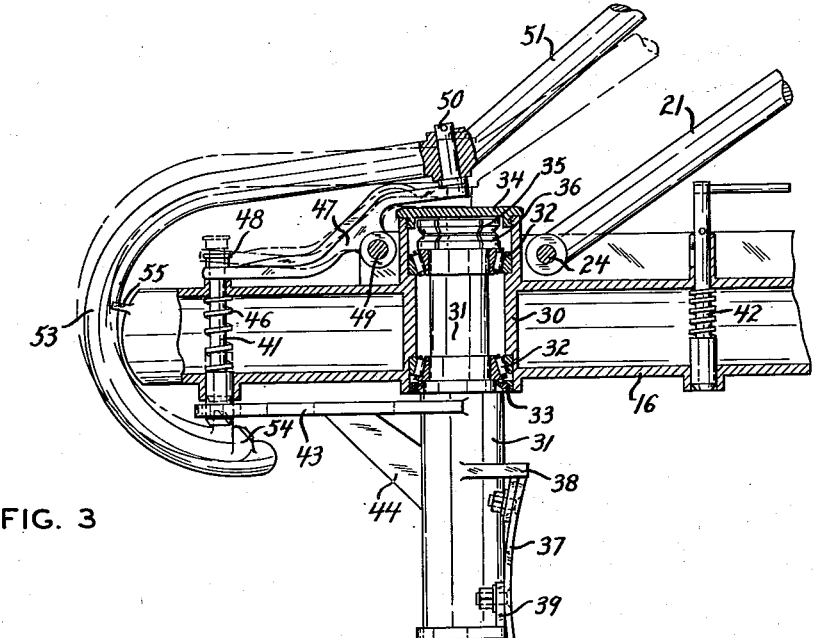
Figure 4:
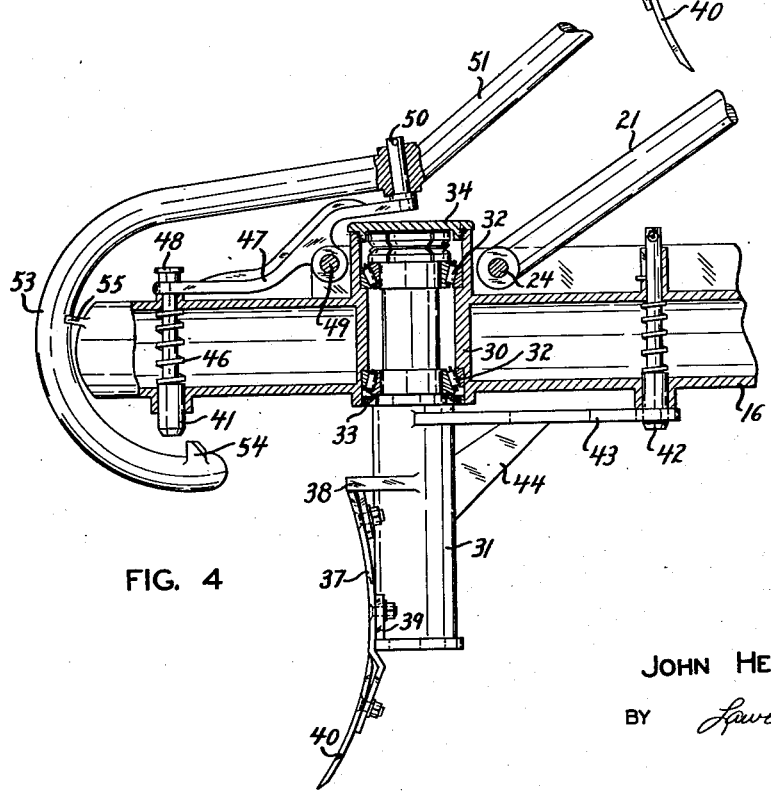

Fig. 3, a side elevational view partly in section, illustrates the blade assembly, the rear portions of the frame structure, and the blade adjusting and locking means;

Fig. 4 is a view similar to Fig. 3, the blade assembly being shown in a relatively reversed position as for "bull-dozing" purposes, and Fig. 5 is a fragmentary plan view showing the blade locking and adjusting plate.

Referring now by characters of reference to the drawings, 10 designates generally the rear parts of a tractor of one well known manufacturer, having, as standard equipment, a pair of rearwardly projecting hitch links 11, spaced apart and located at opposite sides of the transmission housing 12, and a third hitch link 13 located centrally and at the top rear of the housing 12. Also provided as standard equipment on this tractor is a hydraulic mechanism for raising and lowering an implement connected to the tractor by links 11, the said mechanism being disposed in the housing 12 and transmitting its power to the hitch links 11 through dual crank arms 14 and links 15. Tractors produced by a number of other manufacturers are similarly provided with means for attaching and varying the operating height of appliances drawn thereby.

Figure 2:
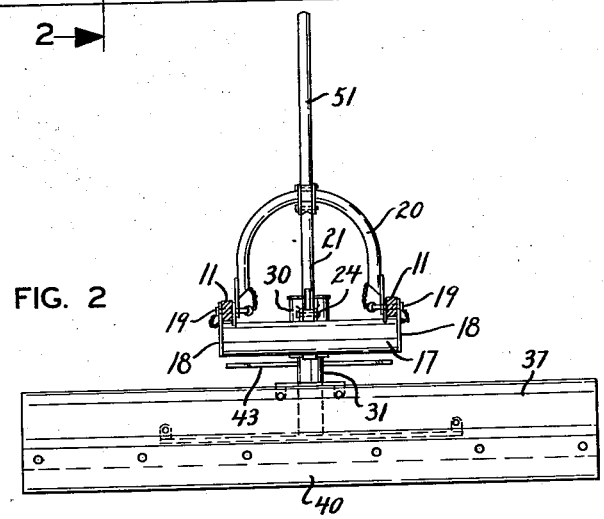
Fig. 2 is a sectional view taken at line 2—2 of Fig. 1.

The improved implement of my invention has a T-shaped frame of tubular construction, comprising a longitudinal member 16 and a transverse member 17 fixedly joined to member 16 at its forward end. Paired bearing lugs 18 at each end of the transverse member 17 are adapted for detachable, pivotal connection with the ends of the tractor hitch links 11 by means of removable coupling pins 19, these pins also serving to connect the lower extremities of an arcuate brace bar 20 to the frame cross bar 17, as best appears in Fig. 2. A diagonally extending link 21 is connected at one end to the crown of the brace bar 20 by a pin 23, and at its opposite end to the longitudinal frame member 16 by a pin connection indicated at 24, the brace bar 20 and link 21 coacting with member 16 to constitute a triangular frame or truss. A third connection between the tractor and the implement comprises a longitudinally adjustable bar, consisting of a tube 25 having right- and left-hand threaded screw parts 26 and 27 threadedly received in its opposite ends. These parts are provided with suitable bearing eyes by which they are pinned respectively to the tractor hitch link 13 and to lugs 28 on the crown portion of the arcuate brace bar 20. A hand wheel 29 fixed to the tube 25 affords means for turning the tube to vary the effective length of the composite bar.

Figure 1:
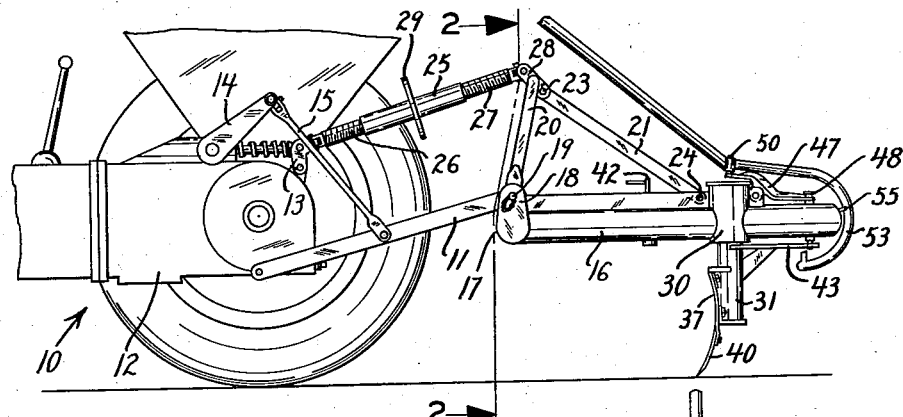
Fig. 1 is a side elevational view of the implement of my invention shown attached to rear portions of a tractor.

From a consideration of Fig. 1 it will appear that when lifting forces are applied to the frame structure through hitch links 11, the entire implement will be elevated without substantial variation in the angular position of the frame with respect to the ground surface. Under certain circumstances a change in the angular setting of the frame structure is desirable and such is accomplished by manipulating the hand wheel 29 to cause the frame to pivot about pins 19, whereby to vary the angle between the frame and hitch links 11. The recited hand wheel adjustment provides for a vertical shifting of the range of movement of the rear end of the frame structure as afforded by the hydraulic lift mechanism, and further enables the operator to vary the angular relationship of the blade and the ground surface.

The longitudinal frame member 16 is provided with a vertical bearing housing 30, integral with the said member and spaced from the rear extremity thereof. As best appears in Fig. 3 a vertical tool post 31 is journalled on anti-friction bearings 32 mounted in the housing 30, and projects downwardly therefrom through a suitable sealing and lubricant retaining ring 33 at the lower end of the housing. The top of the said housing is normally closed by a removable threaded cap plate 34 having a thrust element 35 thereon disposed in opposition to a retainer nut 36 on the upper end of the tool post, the elements 35 and 36 affording means for eliminating undue endwise play in the tool post.

The tool post carries at one side of its lower end portion a blade or mold board 37 which is rigidly bolted to bracket means 38 and 39 integral with the said post. The blade is provided with a detachable edge piece 40.

The described blade structure is adapted to be turned in the post bearings through an angle of 360°, and to be locked in a variety of different angular settings by locking pins 41 or 42, in coaction with a semi-circular locking plate 43, the latter also functioning as a part of the blade adjusting means to be hereinafter described. Plate 43 is rigidly secured to the post 31 at a point adjacent the under side of the longitudinal frame member 16, and is braced by an underlying diagonal strut 44. Locking pin 41 extends vertically through guide openings in the frame member 16 near the rear extremity thereof, and its lower projecting end is adapted to engage plate 43 at any one of a series of spaced openings 45 near the edge of the plate. Pin 41 is normally biased downwardly by compression spring 46, and is adapted to be retracted upwardly out of locking engagement with the plate by means of a latch lever 47 longitudinally mounted on the upper side of frame member 16. The locking pin 41 extends through a bifurcated end portion of the latch lever and has an enlarged head or cap 48 seating thereon. Latch lever 47 is pivoted to the frame member 16 by a horizontal fulcrum pin 49, and extends forwardly therefrom to a point above the journal housing 30. A vertically projecting pin 50 is provided on the forward end of lever 47, which pin is positioned on the lever so as to be in substantial alignment with the axis of post 31 when the lever is rocked to lift the locking pin out of engagement with the plate 43, such relative disposition of the parts being illustrated in broken lines in Fig. 3.

Rocking of the latch lever to release the blade structure for angular adjustment is accomplished by a control lever 51 which is pivotally mounted on lever 47 by the upstanding pivot pin 50. The control lever 51 extends forwardly from its pivotal axis and is of sufficient length so as to be readily manipulable by an operator on the driver's seat of the tractor. The other arm 53 of lever 51 is curved as shown and has an upstanding finger 54 thereon which normally is spaced below the plane of plate 43.

When aligned with one of the plate openings 45 the finger 54 moves upwardly and enters the same when the control lever handle 51 is depressed, whereby to effect an operative connection between said lever and the blade assembly. Accordingly, horizontal shifting movement of the control lever on the vertical pivot pin 50 will, under the recited condition, be transmitted to the blade assembly.

A stirrup lug 55 on the rear end of the frame bar 16 affords a seat for the lever arm 53 to fixedly position the control lever, and to prevent casual movement thereof when the lever is not being used. The spring 46 acts through the locking pin and latch lever 47 to retain the control lever in the stirrup lug 55. As will appear from Fig. 3 when the control lever is rocked vertically to unlock the blade structure it is at the same time removed from the environs of the stirrup lug 55 and can be swung horizontally to change the angular position of the blade.

In order to adjust the blade structure the latter is first elevated, preferably by the hydraulic mechanism, so as to be completely out of contact with the ground. The control handle 51 is then depressed to (1) disengage locking pin 41 from the plate 43, (2) operatively connect itself to the plate 43, and (3) free itself from the retaining stirrup 55. Thereafter, while holding the control handle in a depressed condition the operator swings the same to the right or left, such movement being transmitted to the blade structure to effect the desired angular setting thereof. Thereafter, the control handle is released, allowing the lock pin 41 to reengage the plate 43, which may require a slight angular readjustment to effect an alignment of the pin with the nearest opening 45 of the plate. Finally the control handle, while free of the blade, is restored to its normal "at rest" position and so retained by the stirrup lugs 55.

The second locking pin 42 is used for securing the blade when the same is positioned for various "dozing" operations, as shown in Fig. 3. This locking device is intended for direct manipulation to lock and unlock the plate 43, which is a satisfactory arrangement because adjustments of the blade angle are seldom necessary when the implement is being used as a dozer.

Having described my invention, what I claim and desire to secure by Letters Patent is:

1. In an earth moving implement of the character described, including a frame and an angularly adjustable blade supporting structure mounted on said frame, means for locking the blade supporting structure with respect to the frame, a blade manipulating handle mounted on and pivotally interconnected with the frame for movement into and out of operative engagement with the blade supporting structure, and means operatively interconnecting said handle and blade locking means, operable upon movement of the handle into engaging relation with the blade supporting structure to release said blade locking means.

2. The subject matter of claim 1 wherein said handle is pivotally interconnected with the frame for movement in different angularly related planes to effect, respectively, release of said blade locking means and angular adjustment of the blade.

3. In an earth moving implement of the character described including a frame and an angularly adjustable scraper blade pivoted thereto, means for locking the blade relative to said frame, a lock releasing member pivoted to the frame, and a blade adjusting handle pivotally connected to said releasing member, said handle being movable in one plane to release said lock and in another plane to effect angular adjustment of the blade.

4. A tractor implement of the character described including a frame and an angularly adjustable blade supporting structure pivoted thereto, said blade supporting structure including a member having a series of spaced holes therein, a retractible locking element on said frame, engageable with said member at any one of said holes, a blade adjusting handle pivotally interconnected with the frame and adapted for disengageable connection with said member, and means connected to and movable by said handle to retract said locking element.

5. A tractor implement of the character described including a frame and an angularly adjustable blade supporting structure pivoted thereto, said blade supporting structure including a member having a series of spaced holes therein, a movable locking element on the frame engageable with said member at any one of said holes, a lock releasing lever pivoted to the frame and connected to said locking element, a blade adjusting lever pivotally mounted on said lock releasing lever for movement in a plane at an angle to the plane of movement of said lock releasing lever, and means on said blade adjusting lever for engaging said member at one of the holes therein.

6. A tractor attachment comprising a frame, a blade supporting structure mounted on the frame for angular adjustment, means for locking the blade supporting structure in any one of a plurality of different angular positions relative to the frame, said means comprising an apertured plate and a retractable locking bolt cooperable therewith, associated respectively with the blade supporting structure and the frame, a release lever for said locking means, said lever being mounted on a horizontal pintle on the frame, a control lever mounted on a vertical pintle on said release lever, and means on said control lever engageable with said apertured plate, said release lever being movable about said horizontal pintle to effect unlocking of the blade structure and operative connection thereof with the control lever, said control lever being movable about said vertical pintle to effect angular adjustment of the blade structure.

JOHN HENRY DANUSER.

REFERENCES CITED

The following references are of record in the file of this patent:

UNITED STATES PATENTS

| Number | Name | Date |
| --- | --- | --- |
| 359,849 | Cook | Mar. 22, 1887 |
| 2,434,818 | Taylor | Jan. 20, 1948 |